United States Patent Office 2,715,103
Patented Aug. 9, 1955

2,715,103

ALKALI METAL NITRITE AS A POLYMERIZATION INHIBITOR FOR DIACETYLENE

Herbert H. Nelson, Dickinson, Tex., assignor to Monsanto Chemical Company, St. Louis, Mo., a corporation of Delaware No Drawing. Application November 12, 1953, Serial No. 391,757

6 Claims. (Cl. 252—1)

This invention relates to the inhibition of polymerization. In one embodiment, it pertains to the inhibition of undesirable polymer growth in processing equipment. Specifically, it is concerned with a method for the stabilization of diacetylene or of mixtures containing diacetylene against polymerization and the stabilized compositions so produced.

If acetylene is produced from hydrocarbons, e. g., by the well known electric arc process or by thermal decomposition or dissociation, the acetylene-containing gas mixture produced generally contains diacetylene as well, in amounts ranging from as little as 0.05% to as much as 5%. The purification of such an acetylenic gas mixture is usually accomplished by the selective action of suitable solvents. A great number and variety of solvents have been proposed and are effectively employed in well-developed purification processes. However, in these conventional methods of absorption and stripping, the gas mixture is exposed to conditions of temperature and pressure under which some of the diacetylene present polymerizes, and provision must be made in all such processes for periodic removal of the diacetylene polymers to prevent their excessive build-up in the solvent in the absorption step. This requires additional, specialized filtration equipment as well as added process steps which are costly with regard to both time and capital expense. Frequently, too, the diacetylene polymer collects in the less accessible parts of the system, fouling up equipment lines, columns, and the like. Usually, this particular polymer is of such a small particle size that it plugs the filter used for separating it, so that only a small amount can be filtered in each operation and an inordinate length of time is required to wring the filter cake dry.

Methods have been proposed for removal of diacetylene from the gas stream, but these are cumbersome and expensive since they require additional process steps prior to the usual solvent purification operation which utilizes special equipment and significant quantities of special chemicals for treating purposes.

It is an object of the present invention, therefore, to provide a method whereby undesirable polymer growth in the solvent purification of acetylene is inhibited.

It is a further object of the invention to provide a method for stabilization of diacetylene against polymerization.

It is a still further object of the invention to provide novel stabilized compositions comprising diacetylene, a solvent therefor, and an added polymerization inhibitor which do not polymerize when subjected to conditions under which such compositions lacking the inhibitor polymerize readily and rapidly.

Other objects and advantages of the invention will be apparent from the following description and appended claims.

According to the invention, diacetylene contained in a solvent is stabilized against polymerization by the addition thereto of small quantities of an alkali metal nitrite. The composition comprising diacetylene, a solvent therefor, and a minor amount of an alkali metal nitrite will not exhibit any significant polymer formation on prolonged periods of storage or when subjected to temperatures commonly encountered in solvent purification systems for acetylene purification.

The following samples illustrate the invention but are not to be construed as limiting it in any manner.

EXAMPLE I

Diacetylene was generated by dropping 40% sodium hydroxide into a well-stirred solution of 1,4-dichlorobutyne in ethanol at a temperature of approximately 75° C. The product gas was passed through dry ice traps and then allowed to bubble through a fritted gas bubbler into technical-grade butyrolacetone at room temperature to make a stock solution of 0.3 g. of diacetylene per milliliter of solution. In the polymerization tests, 20 ml. of a test mixture containing a known amount of the diacetylene stock solution, butyrolactone, water, and a weighed amount of the inhibitor were introduced into a thick-walled test tube. The mixture was frozen and the end of the test tube was drawn off in a torch flame to make a sealed ampoule. The sealed ampoules were wrapped in bronze screen and placed in an oven maintained at 125° C. for 16 hours, after which they were removed and inspected for polymer content. Blanks were run in which only butyrolactone-water mixtures and mixtures of butyrolactone, water and diacetylene were present. Results of a series of such tests are presented in Table I.

*Table I*

| Test No. | Test Mixture | Condition of Test Mixture |
|---|---|---|
| 1 | 50% BL*–50% $H_2O$ | Usual straw color; perfectly clear; unchanged. |
| 2 | 50% BL*–50% $H_2O$ plus 0.25% diacetylene. | Reddish brown suspension of polymer; fairly heavy ppt. of finely divided material. |
| 3 | Same as in Test No. 2 above plus 0.05% sodium nitrite. | Medium red-brown suspension; coagulated red-brown ppt. settled out. |
| 4 | Same as in Test No. 2 above plus 0.1% sodium nitrite. | Same as in Test No. 3 above. |
| 5 | Same as in Test No. 2 above plus 0.5% sodium nitrite. | Light, red-brown solution, faintly hazy; containing a few particles of polymer in liquid; no ppt. settled out. |
| 6 | Same as in Test No. 2 above plus 1% sodium nitrite. | Clear yellow-orange solution; no ppt. at all. |
| 7 | Same as in Test No. 2 above plus 1.5% sodium nitrite. | Clear yellow solution, somewhat lighter than in Test No. 6 above. |

*Butyrolactone.

EXAMPLE II

After a qualitative inspection of their contents (the results of which are described in Table I), the test ampoules of Example I were again subjected to storage in an oven at 125° C. The ampoules were removed after certain elapsed periods of time for visual inspection. Results of these extended tests are presented in Table II.

Table II

| Test No. | Test Mixture | Storage Period | Condition of Test Mixture |
|---|---|---|---|
| | | Hours | |
| 1 | 50% BL*–50% H₂O | 37 | No change. |
| 2 | 50% BL*–50% H₂O—0.25% diacetylene plus 0.05% sodium nitrite. | 37 | Not much change; coagulated ppt. |
| 3 | 50% BL*–50% H₂O—0.25% diacetylene plus 0.1% sodium nitrite. | 37 | Same as in Test No. 2 above. |
| 4 | 50% BL*–50% H₂O—0.25% diacetylene plus 0.5% sodium nitrite. | 37 | Wine colored solution; minute amount of polymer. |
| 5 | 50% BL*–50% H₂O—0.25% diacetylene plus 1.0% sodium nitrite. | 37 | Amber colored solution; faintly hazy; no ppt. |
| 6 | 50% BL*–50% H₂O—0.25% diacetylene plus 1.5% sodium nitrite. | 37 | Pale amber-colored solution; clear; no ppt. at all. |
| 7 | Same as in Test No. 2 above. | 53 | Apparently all diacetylene polymerized; all polymer ppt. out leaving clear supernatant liquid. |
| 8 | Same as in Test No. 3 above. | 53 | Same as in Test No. 7 above. |
| 9 | Same as in Test No. 4 above. | 53 | Not as much ppt. of polymer as in Tests No. 7 and 8 above. |
| 10 | Same as in Test No. 5 above. | 53 | Very small amount of polymer precipitated. |
| 11 | Same as in Test No. 6 above. | 53 | Clear, dark amber solution; no visible ppt. |
| 12 | Same as in Test No. 2 above. | 69 | All diacetylene apparently polymerized; polymer settled out. |
| 13 | Same as in Test No. 3 above. | 69 | Same as in Test No. 12 above. |
| 14 | Same as in Test No. 4 above. | 69 | Ppt. but not as much as in Tests No. 12 and 13 above. |
| 15 | Same as in Test No. 5 above. | 69 | Fair amount of coagulated ppt. |
| 16 | Same as in Test No. 6 above. | 69 | Dark amber-colored solution still perfectly clear and free of solids. |

* Butyrolactone.

From these results, it will be seen that even under the most severe or drastic conditions, amounts of sodium nitrite ranging from 1% by weight upwards will effectively inhibit polymerization of diacetylene contained in a solvent.

While the preceding examples have illustrated a specific embodiment of the invention, substantial variations may be made without departing from the scope thereof. For example, other alkali metal nitrites such as those of potassium and lithium can be substituted for sodium nitrite to provide comparable stabilization of diacetylene against polymerization.

The quantity of alkali metal nitrite used to inhibit polymerization of diacetylene can be varied widely, although the amount used depends somewhat on the amount of diacetylene present and the degree of inhibition desired. In general, only minor quantities of the inhibitor are required. Concentrations in the range of about 1% to about 10% by weight of the total composition are suitable, with concentrations from about 1.0% to about 2.0% being preferred. The stabilizing agent may, of course, be employed in as great a concentration as desired.

The inhibitor of the invention is not restricted to use with butyrolactone as set out in the example above. The alkali metal nitrites may be used to inhibit the polymerization of diacetylene in other like organic solvents. In solvent systems where such solvents are used to absorb acetylene from a gas stream containing it in combination with other gases including diacetylene, polymerization of the diacetylene is effectively inhibited by the presence of a minor amount of the alkali metal nitrite. To inhibit polymer formation during the absorption-stripping operation, the inhibitor can be added directly to the solvent feed stream, or it may be introduced as a solution of the desired concentration at some point in the absorption system.

The inhibitor of the invention may also be utilized for preparing stabilized compositions of diacetylene in a solvent which can be safely stored over a period of time without undergoing polymerization with its usual attendant hazards.

The term "consisting essentially of" which appears in the claims hereof is intended to refer to a composition in which the total amounts of the components set forth in the claim constitutes the predominant proportion in the composition. Such term is not intended to exclude the presence of materials such as moisture or water or other material which may be present as an inert diluent and does not adversely affect the solution in any manner. However, the term is intended to exclude the presence of materials which so change the character of the composition that it can no longer be regarded as a solution of diacetylene.

What is claimed is:

1. A composition of matter consisting essentially of diacetylene, a solvent therefor, and an alkali metal nitrite in an amount from about 1% to about 10% by weight of the total composition.

2. A composition of matter consisting essentially of diacetylene, a solvent therefor, and sodium nitrite in an amount from about 1% to about 10% by weight of the total composition.

3. A composition of matter consisting essentially of diacetylene, a solvent therefor, and sodium nitrite in an amount from about 1% to about 2% by weight of the total composition.

4. A composition of matter consisting essentially of diacetylene, butyrolactone, and an alkali metal nitrite in an amount from about 1% to about 10% by weight of the total composition.

5. A composition of matter consisting essentially of diacetylene, butyrolactone, and sodium nitrite in a amount from about 1% to about 10% by weight of the total composition.

6. A composition of matter consisting essentially of diacetylene, butyrolactone, and sodium nitrite in an amount from about 1% to about 2% by weight of the total composition.

References Cited in the file of this patent

UNITED STATES PATENTS

| 2,601,673 | McMillan et al. | June 24, 1952 |
| 2,629,708 | Uraneck | Feb. 24, 1953 |
| 2,629,709 | Uraneck | Feb. 24, 1953 |